(12) United States Patent
Ishikawa

(10) Patent No.: US 8,981,017 B2
(45) Date of Patent: Mar. 17, 2015

(54) POLYCARBONATE-POLYORGANOSILOXANE COPOLYMER, PROCESS FOR PRODUCTION OF THE COPOLYMER, AND POLYCARBONATE RESIN CONTAINING THE COPOLYMER

(75) Inventor: Yasuhiro Ishikawa, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 354 days.

(21) Appl. No.: 13/514,805

(22) PCT Filed: Dec. 9, 2010

(86) PCT No.: PCT/JP2010/072176
§ 371 (c)(1),
(2), (4) Date: Jul. 23, 2012

(87) PCT Pub. No.: WO2011/071128
PCT Pub. Date: Jun. 16, 2011

(65) Prior Publication Data
US 2012/0283393 A1 Nov. 8, 2012

(30) Foreign Application Priority Data
Dec. 10, 2009 (JP) ................................. 2009-280453

(51) Int. Cl.
C08G 64/00 (2006.01)
C08G 64/18 (2006.01)
C08G 77/448 (2006.01)
C08G 63/02 (2006.01)

(52) U.S. Cl.
CPC ............ *C08G 64/186* (2013.01); *C08G 77/448* (2013.01)
USPC .............. 525/474; 528/25; 528/196; 528/198

(58) Field of Classification Search
USPC ............................. 525/474; 528/25, 196, 198
See application file for complete search history.

(56) References Cited

U.S. PATENT DOCUMENTS

| | | | |
|---|---|---|---|
| 3,189,662 A | 6/1965 | Vaughn, Jr. | |
| 4,584,360 A | 4/1986 | Paul et al. | |
| 5,502,134 A | 3/1996 | Okamoto et al. | |
| 2005/0187372 A1 | 8/2005 | Venderbosch et al. | |
| 2008/0081893 A1 | 4/2008 | Hoover et al. | |
| 2012/0108739 A1 | 5/2012 | Ishikawa et al. | |

FOREIGN PATENT DOCUMENTS

| | | |
|---|---|---|
| CN | 1751096 A | 3/2006 |
| JP | 11 451 39 | 6/1989 |
| JP | 05 200761 | 8/1993 |
| JP | 05 200827 | 8/1993 |
| JP | 05 202181 | 8/1993 |
| JP | 05 202182 | 8/1993 |
| JP | 5 247195 | 9/1993 |
| JP | 07 258398 | 10/1995 |
| JP | 2662310 | 10/1997 |
| JP | 10 245711 | 9/1998 |
| JP | 2005 519177 | 6/2005 |
| JP | 2005 535761 | 11/2005 |
| JP | 2006 523243 | 10/2006 |
| TW | 570954 B | 1/2004 |

OTHER PUBLICATIONS

Extended European Search Report issued Jun. 23, 2014 in Patent Application No. 10836048.8.
International Search Report issued Mar. 15, 2011 in PCT/JP2010/072176 Filed Dec. 9, 2010.
Combined Office Action and Search Report issued Nov. 28, 2013 in Chinese Application No. 201080055804.1 (With English Translation of Category of Cited Documents).
Hengjie Gu, et al., "Organic Chemistry", Higher Education Press, Oct. 31, 1990, 14 pages (With English Translation of Paragraph 3 of p. 297).
Combined Taiwanese Office Action and Search Report issued Sep. 9, 2014 in Patent Application No. 099143322 (with English translation of categories of cited documents).

*Primary Examiner* — Terressa Boykin
(74) *Attorney, Agent, or Firm* — Oblon, McClelland, Maier & Neustadt, L.L.P.

(57) ABSTRACT

The present invention is a polycarbonate-polyorganosiloxane copolymer (A-1) comprising a polycarbonate block composed of a specific structural unit and a polyorganosiloxane block composed of a specific structural unit, wherein
 (1) the content of the polyorganosiloxane block portion is 1 to 30% by mass,
 (2) the average number of the repeating structural units represented by the general formula (II) is 70 to 1000,
 (3) the viscosity-average molecular weight of the copolymer is 13000 to 26000, and
 (4) the content of the phenol residue having an allyl group in the copolymer is 400 ppm by mass or less, the copolymer providing a molded article having excellent thermal stability and excellent color tone after even when the molding is carried out at high temperature; a process for production of the copolymer; and a polycarbonate resin using the polycarbonate-polyorganosiloxane copolymer.

11 Claims, No Drawings

POLYCARBONATE-POLYORGANOSILOXANE COPOLYMER, PROCESS FOR PRODUCTION OF THE COPOLYMER, AND POLYCARBONATE RESIN CONTAINING THE COPOLYMER

TECHNICAL FIELD

The present invention relates to a polycarbonate-polyorganosiloxane copolymer, a process for production of the copolymer, and a polycarbonate resin containing the copolymer. Specifically, the present invention relates to a polycarbonate-polyorganosiloxane copolymer which provides a molded article having excellent thermal stability and excellent color tone even when the molding is carried out at high temperature, a process for production of the copolymer, and a polycarbonate resin containing the copolymer.

BACKGROUND ART

A polycarbonate resin produced from bisphenol A, etc. has excellent thermal stability and mechanical characteristics, and therefore is used as a material for various parts in an electrical and electronics field, an automotive field, and the like. However, depending on the application, there are occasional demands for flame retardancy and impact resistance which cannot be satisfied by the polycarbonate resin comprising bisphenol A.

On the other hand, a polycarbonate-polydimethylsiloxane copolymer (PC-PDMS copolymer) is known as a polycarbonate resin having excellent flame retardancy and impact resistance (see, for example, PTL 1). The PC-PDMS copolymer can provide a molded product having improved lubricity, abrasion resistance, and the like. As the molded product thereof, there are known, for example, a cast film, an extrusion molded film, and the like (see, for example, PTL 2-5).

Furthermore, the characteristic features exhibited by the PC-PDMS copolymer are exhibited depending on the number of the repeating siloxane units. For example, a PC-PDMS copolymer having n, the number of the repeating siloxane units, ranging from 40 to 60, specifically a PC-PDMS copolymer having n of 49, shows good low temperature impact properties (see, for example, PTL 6); there is known a process for obtaining a transparent PC-PDMS copolymer by using PDMS having n, the number of the repeating siloxane units, of 50 (see, for example, PTL 7); and there is known a PC-PDMS copolymer using PDMS having n, the number of the repeating siloxane units, of 0 to 20, which is transparent and flame retardant (see, for example, PTL 8).

As described above, it is known that the PC-PDMS copolymer, due to the characteristic features thereof, can be developed for many applications including a helmet with a transparent visor (see, for example, PTL 9), a material for manufacturing key top members, and the like.

Further, with regard to the PC-PDMS copolymer, it is known to modify both molecular ends of the raw material PDMS. As a process for producing the modified PDMS, there are known, for example, (1) a process wherein polydimethylsiloxane is reacted with allylphenol and, thereafter, excess allylphenol is removed by washing with aqueous alcohol (see, for example, PTL 1), (2) a process wherein polydimethylsiloxane is reacted with eugenol (2-methoxy-4-allylphenol) and, thereafter, low molecular weight organosiloxane compounds are removed by evaporation (see, for example, PTL 11), and the like.

And recently, a material which possesses the characteristics of the above-mentioned PC-PDMS copolymer has come to be desired in many applications and it became necessary to adapt the material to a variety of shapes of the molded products. Therefore, it is necessary to secure fluidity of the resin and the temperature of the molding process tends to increase.

However, there has been a problem that the PC-PDMS copolymer tends to become yellow more easily than a general polycarbonate resin during a high temperature molding process. There is no information available on this yellowing unique to the PC-PDMS copolymer and improvement thereof.

CITATION LIST

Patent Literature

[PTL 1] JP No. 2662310 B
[PTL 2] JP No. 05-202181 A
[PTL 3] JP No. 05-202182 A
[PTL 4] JP No. 05-200761 A
[PTL 5] JP No. 05-200827 A
[PTL 6] JP No. 2006-523243 A
[PTL 7] JP No. 2005-535761 A
[PTL 8] JP No. 2005-519177 A
[PTL 9] JP No. 10-245711 A
[PTL 10] JP No. 11-45139 A
[PTL 11] JP No. 05-247195 A

SUMMARY OF INVENTION

Problem to be Solved by the Invention

The present inventors conducted various studies on the yellowing problem of the PC-PDMS copolymer and, as a result, have discovered that the problem is caused by impurities present in the PDMS used in the production of the PC-PDMS copolymer. That is, the present inventors discovered that the problem is due to a phenol compound having an allyl group, which remains as an unreacted component in polyorganosiloxane having both molecular ends of the raw material modified.

However, the conventional technology does not provide any quantitative information about the residual amount of the phenol compound having an allyl group and nothing is known about its effect either.

Accordingly, in view of the above-mentioned circumstances, an object of the present invention is, in a polycarbonate-polyorganosiloxane copolymer (PC-POS copolymer), to develop a process for the production of the PC-POS copolymer wherein the residual amount of the phenol compound having an allyl group in the POS having both molecular ends of the raw material modified can be decreased to a specific amount or less, and further to provide a PC-POS copolymer which provides a molded article having excellent thermal stability and excellent color tone after even when the molding is carried out at high temperature as well as a process for the production of the copolymer.

Furthermore, another object of the present invention is to provide a polycarbonate resin using the above-described PC-POS copolymer.

Solution to Problem

The present inventors conducted diligent studies and, as a result, have discovered that the above-described objects can be achieved by using, as the raw material, a POS having both molecular ends modified and containing the residual phenol compound having an allyl group in a specific amount or less, and have completed the present invention. That is, the present invention is a PC-POS copolymer described below, a process for producing the copolymer, and a polycarbonate resin using the PC-POS copolymer:

1. A polycarbonate-polyorganosiloxane copolymer (A-1) comprising a polycarbonate block composed of a structural unit represented by the following general formula (I) and a polyorganosiloxane block composed of a structural unit represented by the following general formula (II), wherein:

(1) the content of the polyorganosiloxane block portion is 1 to 30% by mass;
(2) the average number of the repeating structural units represented by the general formula (II) is 70 to 1000;
(3) the viscosity-average molecular weight of the copolymer is 13000 to 26000; and
(4) the content of the phenol residue having an allyl group in the copolymer is 400 ppm by mass or less:

[Formula 1]

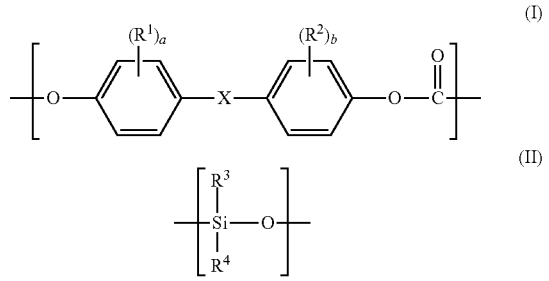

wherein $R^1$ and $R^2$ each independently represent an alkyl group having 1 to 6 carbon atoms or an alkoxy group having 1 to 6 carbon atoms; X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—; $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms; and a and b each independently represent an integer from 0 to 4.

2. The polycarbonate-polyorganosiloxane copolymer according to the item 1, wherein the phenol residue having an allyl group is an allylphenol residue or an eugenol residue.

3. The polycarbonate-polyorganosiloxane copolymer according to the item 1, wherein the structural unit represented by the general formula (I) is a structural unit derived from bisphenol A.

4. The polycarbonate-polyorganosiloxane copolymer according to the item 1, wherein $R^3$ and $R^4$ in the structural unit represented by the general formula (II) are both methyl groups.

5. A polycarbonate resin comprising 100 parts by mass of the polycarbonate-polyorganosiloxane copolymer (A-1) according to 1 described above and 0 to 90 parts by mass of an aromatic polycarbonate (A-2) other than (A-1), wherein the content of the phenol residue having an allyl group in the polycarbonate is 200 ppm by mass or less.

6. A process for the production of the polycarbonate-polyorganosiloxane copolymer, comprising mixing a polycarbonate oligomer and a polyorganosiloxane having molecular ends modified with a phenol compound having an allyl group represented by the following general formula (III) and thereafter reacting the mixture with a dihydric phenol, wherein there is used a polyorganosiloxane which content of the phenol compound having an allyl group is 3000 ppm by mass or less:

[Formula 2]

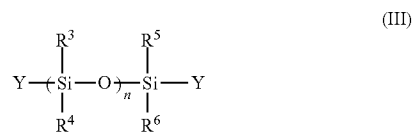

wherein, in the formula (III), $R^3$, $R^4$, $R^5$, and $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms; Y represents a phenol residue having a trimethylene group represented by the following general formula (IV); and n represents 70 to 1000:

[Formula 3]

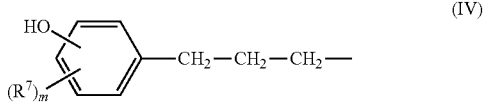

wherein, in the formula (IV), $R^7$ represents an alkyl group having 1 to 4 carbon atoms or an alkoxy group having 1 to 4 carbon atoms; m represents an integer from 0 to 4; and when there are a plurality of $R^7$'s, they may be the same or different.

7. The process for production of the polycarbonate-polyorganosiloxane copolymer according to the item 6, wherein the phenol compound having an allyl group is allylphenol or eugenol.

Advantageous Effect of Invention

By using the PC-POS copolymer of the present invention, there can be provided a molded article having excellent thermal stability and excellent color tone after even when the molding is carried out at high temperature, while maintaining the impact resistance of the PC-POS copolymer.

DESCRIPTION OF EMBODIMENTS

Polycarbonate-Polyorganosiloxane Copolymer

The polycarbonate-polyorganosiloxane copolymer (PC-POS copolymer) of the present invention is a polycarbonate-polyorganosiloxane copolymer (A-1) comprising a polycarbonate block composed of a structural unit represented by the following general formula (I) and a polyorganosiloxane block composed of a structural unit represented by the following general formula (II), and is characterized by the following (1) to (4) as will be described later:

(1) the content of the polyorganosiloxane block portion is 1 to 30% by mass;
(2) the average number of the repeating structural units represented by the general formula (II) is 70 to 1000;
(3) the viscosity-average molecular weight of the copolymer is 13000 to 26000; and
(4) the content of phenol residue having an allyl group in the copolymer is 400 ppm by mass or less:

[Formula 4]

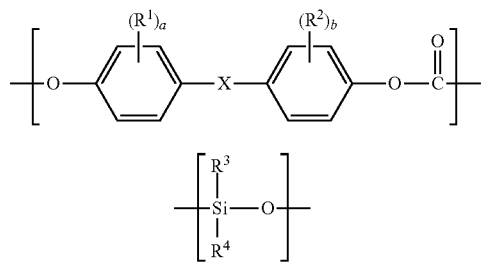

wherein, in the formula (I), $R^1$ and $R^2$ each independently represent an alkyl group having 1 to 6 carbon atoms or an alkoxy group having 1 to 6 carbon atoms; X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—; and wherein, in the formula (II), $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms; and a and b each independently represent an integer from 0 to 4.

(Process for Production of PC-POS Copolymer)

The PC-POS copolymer of the present invention can be produced by mixing a polycarbonate oligomer and a polyorganosiloxane having molecular ends modified with a phenol compound having an allyl group and represented by the following general formula (III), and subsequently reacting the mixture with a dihydric phenol in the presence of an alkaline compound.

It is necessary that the polyorganosiloxane used here is such that the content of the phenol compound having an allyl group, remaining in the polyorganosiloxane as an unreacted component, is 3000 ppm by mass or less:

[Formula 5]

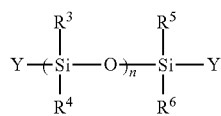

wherein, in the formula (III), $R^3$, $R^4$, $R^5$, and $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms; Y represents a phenol residue having a trimethylene group, represented by the following general formula (IV), the phenol residue being derived from a phenol compound having an allyl group; and n represents 70 to 1000:

[Formula 6]

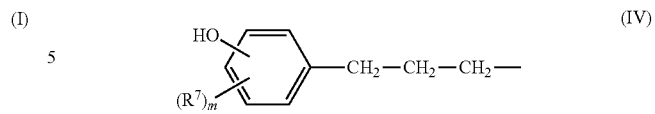

wherein, in the formula (IV), $R^7$ represents an alkyl group having 1 to 4 carbon atoms or an alkoxy group having 1 to 4 carbon atoms; m represents an integer from 0 to 4; and when there are a plurality of $R^7$'s, they may be the same or different. The preferable phenol residue having a trimethylene group includes an allyl phenol residue and an eugenol residue, and the especially preferable phenol residue having a trimethylene group includes the 2-allylphenol residue and the eugenol residue, which are represented by the following formulae:

[Formula 7]

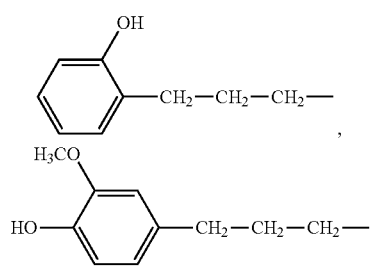

The polycarbonate oligomer, which can be used for the production of the PC-POS copolymer, can be produced by a solvent method, that is by a reaction of a dihydric phenol and a carbonate precursor such as phosgene or by an ester exchange reaction of a dihydric phenol and a carbonate precursor such as diphenyl carbonate, carried out in a solvent such as methylene chloride and in the presence of a publicly known acid acceptor and a molecular weight modifier. Here, various compounds may be mentioned as the dihydric phenol but especially preferred is 2,2-bis(4-hydroxyphenyl)propane [common name: bisphenol A].

The dihydric phenol other than bisphenol A includes, for example, bis(hydroxyaryl)alkanes such as bis(4-hydroxyphenyl)methane, 1,1-bis(4-hydroxyphenyl)ethane, 2,2-bis(4-hydroxyphenyl)butane, 2,2-bis(4-hydroxyphenyl)octane, 2,2-bis(4-hydroxyphenyl)phenylmethane, 2,2-bis(4-hydroxy-3-methylphenyl)propane, bis(4-hydroxyphenyl)naphthylmethane, 1,1-bis(4-hydroxy-t-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, 2,2-bis(4-hydroxy-3,5-dibromophenyl)propane, and the like; bis(hydroxyaryl)cycloalkanes such as 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornene, and the like; dihydroxyaryl ethers such as 4,4'-dihydroxydiphenyl ether, 4,4'-dihydroxy-3,3'-dimethylphenyl ether, and the like; dihydroxydiaryl sulfides such as 4,4'-dihydroxydiphenyl sulfide, 4,4'-dihydroxy-3,3'-dimethyldiphenyl sulfide, and the like; dihydroxydiaryl sulfoxides such as 4,4'-dihydroxydiphenyl sulfoxide, 4,4'-dihydroxy-3,3'-dimethyldiphenyl sulfoxide, and the like; dihydroxydiaryl sulfones such as 4,4'-dihydroxydiphenyl sulfone, 4,4'-dihydroxy-3,3'-dimethyldiphenyl sulfone, and the like; dihydroxydiphenyls such as 4,4'-dihydroxydiphenyl, and the like; dihydroxydiarylfluorenes such as 9,9-bis(4-hydroxyphenyl)fluorene, 9,9-bis(4-hydroxy-3-methylphenyl)fluorene, and the like; bis(4-hydroxyphenyl)diphenylmethane; dihydroxydiaryladamantanes such as 1,3-bis(4-hydroxyphenyl)adamantane, 2,2-bis(4-hydroxyphenyl)adamantane, 1,3-bis(4-hydroxyphenyl)-5,7-dimethyladamantane, and the like; bis(4-hydroxyphenyl)diphenylmethane; 4,4'-[1,3-phenylenebis(1-methyl ethylidene)]bisphenol; 10,10-bis(4-hydroxyphenyl)-9-anthrone; 1,5-bis(4-hydroxyphenylthio)-2,3-dioxapentaene, and the like. These may be used each singly or as a mixture of two or more kinds. Furthermore, a polyfunctional aromatic compound as a branching agent may be used together with the above-described dihydric phenols. The molecular weight of the polycarbonate oligomer used in the present invention is, in terms of the weight-average molecular weight (Mw), preferably in a range of 5000 or less.

In addition, as the dihydric phenol which can be used for production of the PC-POS copolymer, there may be used the same compounds as those exemplified as the dihydric phenols usable for the production of the above-described polycarbonate oligomer.

The polyorganosiloxane which can be used for production of the PC-POS copolymer is one obtained by modifying the molecular ends of the polyorganosiloxane, having hydrogen atoms at the molecular ends, with a phenol compound having an allyl group and is represented by the above-described general formula (III). The polyorganosiloxane having molecular ends modified with the phenol compound having an allyl group can be synthesized by a process described in Japanese Patent No. 2662310 as specifically described in the following.

The polyorganosiloxane having hydrogen atoms at the molecular ends can be synthesized, for example, by reacting octamethylcyclotetrasiloxane and disiloxane. In this case, the number of the repeating dimethylsiloxane units, n, can be controlled by the ratio of the amounts of octamethylcyclotetrasiloxane and disiloxane. By reacting the thus synthesized polydimethylsiloxane having hydrogen atoms at the molecular ends with a phenol compound having an allyl group such as allylphenol and the like, there can be synthesized a polyorganosiloxane having molecular ends modified with the phenol compound having an allyl group.

In the present invention, the phenol compound having an allyl group includes, for example, 2-allylphenol, 3-allylphenol, 4-allylphenol, 2-methoxy-4-allylphenol [eugenol], 2-methoxy-5-allylphenol, 2-methoxy-6-allylphenol, and the like; preferably, it is desirable to use 2-allylphenol and eugenol.

In addition, because the polyorganosiloxane synthesized having both molecular ends modified contains a residual unreacted raw material, it is necessary to remove the same by a process such as vacuum distillation and the like.

Here, in the present invention, it is necessary that the polyorganosiloxane used for the production of the PO-POS copolymer is such that, as described above, the content of the phenol compound having an allyl group, which is remaining in the polyorganosiloxane as an unreacted component, is 3000 ppm by mass or less.

In the production of the PC-POS copolymer, if a phenol compound having an unreacted allyl group becomes mixed in the polyorganosiloxane having both molecular ends of the raw material modified, the phenolic hydroxyl group of this phenol compound having an unreacted allyl group is thought to react with the chloroformate of the polycarbonate oligomer and act as an end stopper to become incorporated at the molecular ends of the PC-POS copolymer as a phenol residue having an allyl group. When molding is carried out under high temperature using this PC-POS copolymer containing a specific amount of the phenol residue having an allyl group, there arise problems such as yellowing of the molded article and the like. In order to improve these problems, it is important that the content of the phenol compound having an allyl group is controlled to 3000 ppm by mass or less.

Usually, in the synthesis of polyorganosiloxane such as described above, removal of the volatile matter by evaporation is generally carried out but this is aimed mainly at removal of octamethylcyclotetrasiloxane (bp 171° C.).

On the other hand, it is not easy to remove the relatively high-boiling phenol compound having an allyl group such as allylphenol (bp 220° C.) and eugenol (254° C.) by evaporation. Especially, when the chain length of the polyorganosiloxane exceeds 70, the viscosity of the polyorganosiloxane itself becomes high. Therefore, removal of the phenol compound having an allyl group by evaporation is difficult and about 15000 ppm by mass thereof remains unevaporated. In addition, removal using aqueous methanol is known but, even by this method, it is difficult to selectively decrease only the phenol compound having an allyl group from the polyorganosiloxane to 2000 ppm by mass or less.

Under the above-described circumstances, the present inventors have discovered that extraction with an aqueous alkaline solution is most effective for the removal of the phenol compound having an allyl group.

As the aqueous alkaline solution, for example, an aqueous sodium hydroxide solution can be used. By repeating extraction with the aqueous alkaline solution, the phenol compound having an allyl group can be decreased to 100 ppm by mass or less, irrespective of the viscosity of the polyorganosiloxane.

In addition, the number of times of the extraction is determined by the amount of removal of the phenol compound having an allyl group. For example, by washing twice, the amount of the phenol compound having the allyl group in the polyorganosiloxane can be decreased to a sufficiently low amount of 2000 ppm by mass or less.

In the present invention, a specific example of the polyorganosiloxane which can be used for production of the PC-POS copolymer includes the compounds represented by the following formulae (a) to (c):

[Formula 8]

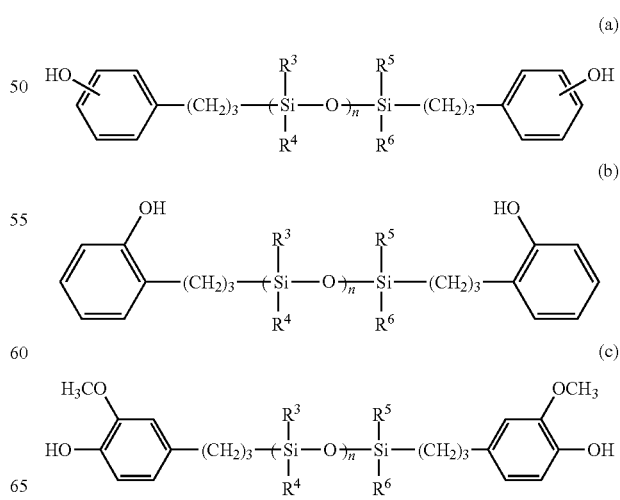

wherein, in the above-described formulae (a) to (c), $R^3$ to $R^6$ and n are the same as defined above.

Of the above formula (a), α,ω-bis[3-(2-hydroxyphenyl)propyl]polydimethylsiloxane represented by (b) or α,ω-bis[3-(4-hydroxy-3-methoxyphenyl)propyl]polydimethylsiloxane represented by the formula (c) is preferable from a viewpoint of availability.

(Characteristics of PC-POS Copolymer)

The PC-POS copolymer of the present invention obtained by the production process mentioned above is characterized in that (1) the content of the polyorganosiloxane block portion is 1 to 30% by mass, preferably 1 to 20% by mass.

If the content becomes less than 1% by mass, the effect of improvement of the drop impact strength is not enough and, if the content is more than 30% by mass, deterioration of the thermal stability becomes significant and also the flame retardancy deteriorates.

The content of the above-described polyorganosiloxane block portion can be controlled by the ratio of use of the polyorganosiloxane having molecular ends modified relative to the dihydric phenol (including the polycarbonate oligomer) such as bisphenol A, which is used in the production of the PC-POS copolymer. The ratio of use of the polyorganosiloxane having molecular ends modified is, relative to the dihydric phenol, usually 1 to 40% by mass, preferably 1 to 25% by mass.

The PC-POS copolymer of the present invention obtained by the production process mentioned above is characterized in that (2) the average number of the repeating structural units represented by the general formula (II) [n, which represents the number of the repeating organosiloxane structural units of the above-described general formula (III)] is 70 to 1000, preferably 70 to 700, and more preferably 70 to 500.

If n is smaller than 70, the effect of improvement of the drop impact strength is not enough and, if n is more than 1000, handling during production of the PC-POS copolymer becomes difficult and economic efficiency deteriorates.

The PC-POS copolymer of the present invention obtained by the production process mentioned above is characterized in that (3) the viscosity-average molecular weight of the copolymer is 13000 to 26000, preferably 13000 to 25000, and more preferably 13000 to 24000.

If the viscosity-average molecular weight is less than 13000, the strength of the molded product is not enough and, if the molecular weight is more than 26000, productivity tends to drop.

The PC-POS copolymer of the present invention obtained by the production process mentioned above is characterized in that (4) the content of the phenol residue having an allyl group in the copolymer is 400 ppm by mass or less, preferably 250 ppm by mass or less, and more preferably 100 ppm by mass or less.

As mentioned previously, the phenol residue having an allyl group in the copolymer results from the phenol compound having an unreacted allyl group in the polyorganosiloxane, which acts as an end stopper, and becomes incorporated at the molecular ends of the PC-POS copolymer. If the content of this phenol residue having an allyl group in the copolymer is more than 400 ppm by mass, yellowing occurs in the PC-POS oligomer during molding under high temperature, presumably due to thermal decomposition.

Measurement of the phenol residue having an allyl group in the PC-POS copolymer is possible by hydrolyzing the PC-POS copolymer using an alkali and analyzing the hydrolysate by high-performance liquid chromatography (HPLC). The specific method of analysis is as follows:

[1] 2 g of a polycarbonate-polyorganosiloxane copolymer is dissolved in 50 mL of methylene chloride,
[2] 5 mL of a 1 mol/L KOH solution in methanol is added and the mixture is stirred for 5 minutes,
[3] 40 mL of pure water is added and the solid material is dissolved,
[4] the solution is neutralized using hydrochloric acid and, thereafter, the organic phase is collected and concentrated, and
[5] the residue is diluted by acetonitrile to a constant volume and, thereafter, analyzed by means of HPLC (manufactured by JASCO Corporation; the eluent is an acetonitrile/water gradient).

[Polycarbonate Resin]

The polycarbonate resin (PC resin) of the present invention comprises 100 parts by mass of the above-mentioned polycarbonate-polyorganosiloxane copolymer (A-1) and 0 to 90 parts by mass of an aromatic polycarbonate (A-2) other than (A-1), wherein the content of the phenol residue having an allyl group in the polycarbonate resin is 200 ppm by mass or less.

Since the aromatic polycarbonate, the (A-2) component, does not contain a phenol compound having an allyl group, even if the amount of the phenol residue having an allyl group in the (A-1) component were 200 to 400 ppm by mass, the effect of the present invention can be obtained if, by blending (A-1) with the (A-2) component, the content of the phenol residue having an allyl group in the PC resin as a whole is decreased to 200 ppm by mass or less.

(Aromatic Polycarbonate (A-2))

The aromatic polycarbonate, the (A-2) component, is not particularly limited as long as it is an aromatic polycarbonate other than (A-1) and does not contain a phenol compound having an allyl group.

For example, there is used a product obtained by a conventional process for the production of the aromatic polycarbonate, including an interfacial polymerization process where a dihydric phenolic compound and phosgene are reacted in the presence of an organic solvent inert to the reaction and an aqueous alkaline solution, followed by polymerization by the addition of a polymerization catalyst such as a tertiary amine, a quaternary ammonium salt, or the like; a pyridine process where a dihydric phenolic compound is dissolved in pyridine or a mixed solvent of pyridine and an inert solvent, followed by introduction of phosgene to directly produce the polycarbonate; and the like. When carrying out the above-described reaction, if necessary, a molecular weight modifier (end stopper), a branching agent, and the like are used.

As the dihydric phenolic compound which is used for the production of the aromatic polycarbonate, the component (A-2), there may be used the same compounds as those exemplified as the dihydric phenols usable for the production of the polycarbonate oligomer, as described in the aforementioned production of the PC-POS copolymer, (A-1).

The molecular weight modifier which can be used for the production of the (A-2) component includes various compounds as long as they are usually used in the polymerization for the PC resin. Specifically, there may be mentioned monohydric phenols such as phenol, o-n-butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, p-t-octylphenol, o-cyclohexylphenol, m-cyclohexylphenol, p-cyclohexylphenol, o-phenylphenol, m-phenylphenol, p-phenylphenol, o-n-nonylphenol, m-nonylphenol, p-n-nonylphenol, o-cumylphenol, m-cumylphenol, p-cumylphenol, o-naphthylphenol, m-naphthylphenol, p-naphthylphenol, 2,5-di-t-butylphenol, 2,4-di-t-butylphenol, 3,5-di-t-butylphenol, 2,5-dicumylphenol, 3,5-dicumylphenol, p-cresol, bromophenol, tribromophenol, a monoalkylphenol having a linear or branched alkyl group having an average number of carbon atoms of 12 to 35 at ortho, meta, or para positions, 9-(4-hydroxyphenyl)-9-(4-methoxyphenyl)fluorene, 9-(4-hydroxy-3-methylphenyl)-9-(4-methoxy-3-methylphenyl) fluorene, 4-(1-adamantyl)phenol, and the like. Of these monohydric phenols, preferably used are p-t-butylphenol, p-cumylphenol, p-phenylphenol, and the like. These monohydric phenols may be used each singly or as a mixture of two or more kinds.

Furthermore, the branching agent may be used together in a range of about 0.01 to 3 mol %, especially 0.1 to 1.0 mol %, relative to the above-described dihydric phenolic compound to provide a branched polycarbonate.

As the branching agent, there may be used a compound having 3 or more functional groups such as 1,1,1-tris(4-hydroxyphenyl)ethane, 4,4'-[1-[4-[1-(4-hydroxyphenyl)-1-methyl ethyl]phenyl]ethylidene]bisphenol, α,α',α"-tris(4-hydroxyphenyl)-1,3,5-triisopropylbenzene, 1-[α-methyl-α-(4'-hydroxyphenyl)ethyl]-4-[α',α'-bis(4"-hydroxyphenyl)ethyl]benzene, phloroglucinol, trimellitic acid, isatin-bis(o-cresol), and the like.

(Additive)

Into the PC resin of the present invention, there may be incorporated upon request various publicly known additives for PC resins. The additives include an antioxidant, an ultraviolet absorber, an antistatic agent, a lubricant, a filler, a dye, a pigment, a flame retardant, an impact resistance improver, and the like.

(Kneading Method and Molding Method)

The above-described polycarbonate resin is obtained by blending and kneading the above-described (A-1) component, (A-2) component, and various additives used upon request. The blending and kneading can be carried out by a method usually employed, for example, a method using a ribbon blender, a Henschel mixer, a Banbury mixer, a drum tumbler, a single screw extruder, a biaxial screw extruder, a co-kneader, a multiaxial screw extruder, and the like. And the heating temperature in blending is selected usually in a range of 250 to 300° C.

In addition, the PC resin can be fabricated into a molded article by application of various known molding methods including, for example, injection molding, blow molding, extrusion molding, compression molding, calendar molding, rotational molding, and the like.

EXAMPLES

Hereinafter, the present invention will be described in more detail by way of Examples, but the present invention is not limited by these Examples in any way.

Synthetic Example 1

Polydimethylsiloxane (PDMS-1)

There were mixed 1483 g of octamethylcyclotetrasiloxane, 30.0 g of 1,1,3,3-tetramethyldisiloxane, and 35 g of 86% by mass sulfuric acid, and the mixture was stirred at room temperature for 17 hours. The oil phase was separated, 25 g of sodium bicarbonate was added thereto, and the mixture was stirred for 1 hour and neutralized. After filtration, the oil phase was subjected to vacuum distillation at 150° C. under 400 Pa to distill off volatile matter containing low-molecular-weight polyorganosiloxane as the main component.

To a mixture of 59 g of 2-allylphenol and 0.0014 g of platinum as a platinum chloride-alcoholate complex, there was added 294 g of the oil obtained above at a temperature of 90° C. This mixture was stirred for 3 hours while maintaining the temperature between 90° C. and 115° C.

The reaction product was dissolved in 10 L of methylene chloride, thereafter washed twice with 1.5 L of a 0.3 mol/L aqueous NaOH solution, washed with 1.5 L of 2% by mass phosphoric acid for neutralization, and further washed once with water. The temperature of the methylene chloride solution was adjusted to 30° C. to 40° C., the solution was concentrated by distillation of methylene chloride under reduced pressure, and methylene chloride was further distilled off at 60° C. under reduced pressure.

According to nuclear magnetic resonance (NMR) measurement and LC measurement, the number of the repeating dimethylsiloxy units in the 2-allylphenol modified PDMS obtained was 90 and the amount of 2-allylphenol in the 2-allylphenol modified PDMS was 1000 ppm by mass.

Synthetic Example 2

PDMS-2

Synthesis was carried out in the same manner as in Synthetic Example 1 except that the number of times of washing with the 0.3 mol/L aqueous NaOH solution was changed to 3.

The number of the repeating dimethylsiloxy units in the 2-allylphenol modified PDMS obtained was 90 and the amount of 2-allylphenol in the 2-allylphenol modified PDMS was less than 100 ppm by mass.

Synthetic Example 3

PDMS-3

Synthesis was carried out in the same manner as in Synthetic Example 1 except that the number of times of washing with the 0.3 mol/L aqueous NaOH solution was changed to 1 and the process of distilling off methylene chloride was carried out under vacuum at 200° C.

The number of the repeating dimethylsiloxy units in the 2-allylphenol modified PDMS obtained was 90 and the amount of the 2-allylphenol in the 2-allylphenol modified PDMS was 2500 ppm by mass.

Synthetic Example 4

PDMS-4

In Synthetic Example 1, the amount of 1,1,3,3-tetramethyldisiloxane was changed to 38.0 g.

According to nuclear magnetic resonance (NMR) measurement and LC measurement, the number of the repeating dimethylsiloxy units in the 2-allylphenol modified PDMS obtained was 70 and the amount of 2-allylphenol in the 2-allylphenol modified PDMS was 800 ppm by mass.

Synthetic Example 5

PDMS-5

In Synthetic Example 1, the amount of 1,1,3,3-tetramethyldisiloxane was changed to 18.0 g.

According to nuclear magnetic resonance (NMR) measurement and LC measurement, the number of the repeating dimethylsiloxy units in the 2-allylphenol modified PDMS was 150 and the amount of 2-allylphenol in the 2-allylphenol modified PDMS was 1100 ppm by mass.

Synthetic Example 6

PDMS-6

In the purification process after the product of Synthetic Example 1 was dissolved in 10 L of methylene chloride, washing was performed 3 times with 80% by mass aqueous methanol. The product solution was dried over anhydrous sodium sulfate and the solvent was distilled off under vacuum at 115° C.

The number of the repeating dimethylsiloxy units in the 2-allylphenol modified PDMS obtained was 90 and the amount of 2-allylphenol in the 2-allylphenol modified PDMS was 15300 ppm by mass.

Synthetic Example 7

PDMS-7

There were mixed 1483 g of octamethylcyclotetrasiloxane, 18.1 g of 1,1,3,3-tetramethyldisiloxane, and 35 g of 86% by mass sulfuric acid, and the mixture was stirred at room temperature for 17 hours. Thereafter, the oil phase was separated, 25 g of sodium bicarbonate was added thereto, and the mixture was stirred for 1 hour. Subsequently, the oil phase was filtered and subjected to vacuum distillation at 150° C. under 400 Pa to remove low-boiling point matter.

To a mixture of 59 g of 2-allylphenol and 0.0014 g of platinum as a platinum chloride-alcoholate complex, there was added 294 g of the oil obtained above at a temperature of 90° C. This mixture was stirred for 3 hours while maintaining the temperature between 90° C. and 115° C. The reaction product was stirred under vacuum at a temperature of 200° C. to remove volatile matter.

The number of the repeating dimethylsiloxy units in the PDMS having molecular ends modified with 2-allylphenol was 90 and the amount of 2-allylphenol in the 2-allylphenol modified PDMS was 14200 ppm by mass.

Synthetic Example 8

PDMS-8

In Synthetic Example 1, 72 g of eugenol was used instead of 59 g of 2-allylphenol.

The number of the repeating dimethylsiloxy units in the PDMS having molecular ends modified with eugenol was 90 and the amount of eugenol in the eugenol modified PDMS was 1000 ppm by mass.

Synthetic Example 9

PDMS-9

Synthesis was carried out in the same manner as in Synthetic Example 8, except that the number of times of washing with a 0.3 mol/L aqueous NaOH solution was changed to 3. The number of the repeating dimethylsiloxy units in the PDMS having molecular ends modified with eugenol was 90 and the amount of eugenol in the eugenol modified PDMS was less than 100 ppm by mass.

Synthetic Example 10

PDMS-10

In Synthetic Example 3, 72 g of eugenol was used instead of 59 g of 2-allylphenol.

The number of the repeating dimethylsiloxy units in the PDMS having molecular ends modified with eugenol was 90 and the amount of eugenol in the eugenol modified PDMS was 16000 ppm by mass.

Synthetic Example of Polycarbonate Oligomer

To a 5.6% by mass aqueous sodium hydroxide solution, there was added sodium dithionite in an amount corresponding to 2000 ppm by mass relative to BPA which will subsequently be dissolved. In this solution was dissolved BPA in such an amount that the concentration of BPA becomes 13.5% by mass. Thus, an aqueous sodium hydroxide solution of BPA was prepared.

This aqueous sodium hydroxide solution of BPA, methylene chloride, and phosgene at flow rates of 40 L/hr, 15 L/hr, and 4.0 kg/hr, respectively were passed continuously through a tubular reactor having an inner diameter of 6 mm and a tube length of 30 m. The tubular reactor had a jacket portion and the temperature of the reaction mixture was maintained at 40° C. or below by passing cooling water through the jacket.

The reaction mixture which flowed out of the tube reactor was continuously introduced into a baffled tank reactor having an inner volume of 40 L and equipped with swept back blades. Hereto were further added the aqueous sodium hydroxide solution of BPA, a 25% by mass aqueous sodium hydroxide solution, water, and a 1% by mass aqueous triethylamine solution at flow rates of 2.8 L/hr, 0.07 L/hr, 17 L/hr, and 0.64 L/hr, respectively, to carry out the reaction. The reaction mixture which outflowed from the tank reactor was drawn out continuously. By allowing the reaction mixture to stand still, the aqueous phase was separated and removed, and the methylene chloride phase was collected.

The thus obtained polycarbonate oligomer had a concentration of 318 g/L and the concentration of the chloroformyloxyl group was 0.75 mol/L. Furthermore, the weight-average molecular weight (Mw) was 1190. In addition, the weight-average molecular weight (Mw) was measured by means of GPC [column: TOSOH TSK-GEL MULTIPORE HXL-M (2 columns)+Shodex KF801 (1 column); temperature, 40° C.; flow rate, 1.0 ml/min; detector, RI] as a polystyrene-equivalent molecular weight (weight-average molecular weight: Mw) using THF (tetrahydrofuran) as an eluent.

Production Example 1

PC-PDMS Copolymer (PC-1)

To a 50 L tank reactor equipped with baffles, paddle type mixing blades, and a cooling jacket, there were charged 15 L of the polycarbonate oligomer solution prepared above, 8.9 L of methylene chloride, 320 g of the PDMS (PDMS-1) having molecular ends modified with 2-allylphenol wherein the number of the repeating dimethylsiloxy units is 90, and 8.8 mL of triethylamine. Under stirring, hereto was added 1389 g of a 6.4% by mass aqueous sodium hydroxide solution and the reaction of the polycarbonate oligomer and the PDMS having molecular ends modified with 2-allylphenol was carried out for 10 minutes.

To this polymerization mixture were added a methylene chloride solution of p-t-butylphenol (PTBP) (a solution obtained by dissolving 137.9 g of PTBP in 2.0 L of methylene chloride) and an aqueous sodium hydroxide solution of BPA (a solution obtained by dissolving 1147 g of BPA in an aqueous solution of 581 g of NaOH and 2.3 g of sodium dithionite dissolved in 8.5 L of water), and the polymerization reaction was carried out for 50 minutes. The reaction mixture was diluted by the addition of 10 L methylene chloride, and the mixture was stirred for 10 minutes. Subsequently, the mixture was separated into an organic phase containing polycarbonate and an aqueous phase containing excess BPA and NaOH, and the organic phase was isolated.

The thus obtained methylene chloride solution of the PC-PDMS copolymer was washed sequentially with a 0.03 mol/L aqueous NaOH solution and 0.2 mol/L hydrochloric acid, each in an amount of 15% by volume relative to the methylene chloride solution, followed by repeated washing with pure water until the electrical conductivity of the aqueous phase after washing became 0.01 μS/m or less. The methylene chloride solution of the PC-PDMS copolymer obtained by washing was concentrated and pulverized, and the flake obtained was dried under vacuum at 120° C.

The amount of the PDMS residue determined by NMR was 5.0% by mass, the viscosity number measured in accordance with ISO 1628-4 (1999) was 47.0, and the viscosity-average molecular weight, Mv, was 17500. Furthermore, the amount of the phenol residue having an allyl group in the PC-PDMS copolymer was less than 100 ppm by mass.

Production Examples 2-14

PC-PDMS Copolymers (PC-2~PC-14)

The PC-PDMS copolymers (PC-2 to PC-14) were produced using the type of PDMS and the amount of use of the PDMS changed as described in Table 2. The amount of the PDMS residue, the viscosity-average molecular weight, Mv, and the amount of the phenol residue having an allyl group in the PC-PDMS copolymer obtained are shown in Table 2.

Examples 1-11, Comparative Examples 1-5

Production of PC Resin

As described in Table 3, the PC-PDMS copolymer (A-1) obtained in Production Examples 1 to 14, a polycarbonate (A-2) other than (A-1), and 0.10 part by mass of IRGAFOS 168 (trade name, produced by Ciba Specialty Chemicals Corporation) were blended and granulated by using a single screw extruder having a screw diameter of 40 mm$^\Phi$ and equipped with a vent at a resin temperature of 280° C. to obtain pellets. Using the pellets obtained, the following evaluation tests were carried out. The results are as described in Table 3.

In addition, the polycarbonate resins used as the (A-2) component are FN 1500A (trade name, a bisphenol A polycarbonate resin produced by Idemitsu Kosan Co., Ltd., viscosity-average molecular weight=14,500), FN 1700A (trade name, a bisphenol A polycarbonate resin produced by Idemitsu Kosan Co., Ltd., viscosity-average molecular weight=17,500)), and FN 2600A (trade name, a bisphenol A polycarbonate resin produced by Idemitsu Kosan Co., Ltd., viscosity-average molecular weight=26,500).

[Evaluation Test]

(1) ΔYI

The pellets obtained were subjected to a dwelling thermal stability test by means of injection molding as follows and a YI value of each molded product was measured. The difference between the YI value after a dwell time of 3 minutes (YIA) and the YI value after a dwell time of 20 minutes (YIB) was obtained as ΔYI.

<Injection Molding>

Injection molding machine: EC-40 (trade name) produced by Toshiba Machine Co., Ltd.
Shape of the molded product: 80 mm×40 mm×3.2 mm
Cylinder temperature of the molding machine: 380° C.
Dwell time in the cylinder: 3 minutes or 20 minutes
Mold temperature: 80° C.

<YI Measurement>

The YI values were measured by means of a spectrocolorimeter, Σ90, produced by Nippon Denshoku Industries Co., Ltd., using a transmission method with a measurement area of 30 φ and a C2 light source.

(2) Izod Impact Strength

The notched Izod impact strength was measured in accordance with JIS-K-7110.

(3) Heat Deformation Temperature (HDT)

The HDT was measured in accordance with ASTM D648 under a load of 0.45 MPa.

The HDT provides a measure of thermal stability.

(4) Viscosity-Average Molecular Weight (Mv)

The limiting viscosity, [η], of a methylene chloride solution was measured at 20° C. by means of an Ubbelohde viscosity tube and the Mv was calculated according to the following relational formula (Schnell's equation): $[\eta]=1.23 \times 10^{-5} \times Mv^{0.83}$.

TABLE 1

| | Synthetic Examples of PDMS | | | | |
|---|---|---|---|---|---|
| | Synthetic Example 1 PDMS-1 | Synthetic Example 2 PDMS-2 | Synthetic Example 3 PDMS-3 | Synthetic Example 4 PDMS-4 | Synthetic Example 5 PDMS-5 |
| Purification method | Washed twice with 0.3 mol/L aqueous NaOH solution | Washed 3 times with 0.3 mol/L aqueous NaOH solution | Washed once with 0.3 mol/L aqueous NaOH solution, followed by evaporation under vacuum at 200° C. | Washed twice with 0.3 mol/L aqueous NaOH solution | Washed twice with 0.3 mol/L aqueous NaOH solution |
| PDMS chain length | 90 | 90 | 90 | 70 | 150 |
| Residual 2-allylphenol (ppm/PDMS) | 1000 | 100> | 2500 | 800 | 1100 |

TABLE 1-continued

Synthetic Examples of PDMS

| | | | | | |
|---|---|---|---|---|---|
| Residual eugenol (ppm/PDMS) | — | — | — | — | — |

| | Synthetic Example 6 PDMS-6 | Synthetic Example 7 PDMS-7 | Synthetic Example 8 PDMS-8 | Synthetic Example 9 PDMS-9 | Synthetic Example 10 PDMS-10 |
|---|---|---|---|---|---|
| Purification method | Washed 3 times with 80% aqueous MeOH | Evaporated under vacuum at 200° C. | Washed twice with 0.3 mol/L aqueous NaOH solution | Washed 3 times with 0.3 mol/L aqueous NaOH solution | Evaporated |
| PDMS chain length | 90 | 90 | 90 | 90 | 90 |
| Residual 2-allylphenol (ppm/PDMS) | 15300 | 14200 | — | — | — |
| Residual eugenol (ppm/PDMS) | — | — | 1000 | 100> | 16000 |

TABLE 2

Production Examples of PC-PDMS

| | Production Example 1 PC-1 | Production Example 2 PC-2 | Production Example 3 PC-3 | Production Example 4 PC-4 | Production Example 5 PC-5 | Production Example 6 PC-6 | Production Example 7 PC-7 | Production Example 8 PC-8 |
|---|---|---|---|---|---|---|---|---|
| PDMS | PDMS-1 | PDMS-1 | PDMS-2 | PDMS-3 | PDMS-3 | PDMS-4 | PDMS-5 | PDMS-6 |
| PDMS amount used (g) | 320 | 670 | 1500 | 320 | 670 | 670 | 320 | 320 |
| PTBP amount used (g) | 137.9 | 137.9 | 137.9 | 125.6 | 137.9 | 137.9 | 137.9 | 137.9 |
| PDMS residue amount (mass %) | 5 | 10 | 20 | 5 | 10 | 10 | 5 | 5 |
| Viscosity number | 47.0 | 46.6 | 46.0 | 49.2 | 46.5 | 46.5 | 48.4 | 47.1 |
| Viscosity-average molecular weight | 17500 | 17300 | 17000 | 18500 | 17300 | 17300 | 18100 | 17500 |
| Phenol residue having allyl group amount (ppm) | 100> | 100> | 100> | 120 | 240 | 100> | 100> | 720 |

| | Production Example 9 PC-9 | Production Example 10 PC-10 | Production Example 11 PC-11 | Production Example 12 PC-12 | Production Example 13 PC-13 | Production Example 14 PC-14 |
|---|---|---|---|---|---|---|
| PDMS | PDMS-6 | PDMS-7 | PDMS-7 | PDMS-8 | PDMS-9 | PDMS-10 |
| PDMS amount used (g) | 670 | 320 | 670 | 320 | 320 | 320 |
| PTBP amount used (g) | 137.9 | 137.9 | 137.9 | 137.9 | 137.9 | 137.9 |
| PDMS residue amount (mass %) | 10 | 5 | 10 | 5 | 5 | 5 |
| Viscosity number | 46.6 | 47.1 | 46.6 | 47.0 | 47.0 | 47.0 |
| Viscosity-average molecular weight | 17300 | 17500 | 17300 | 17500 | 17500 | 17500 |
| Phenol residue having allyl group amount (ppm) | 1380 | 650 | 1290 | 100> | 100> | 750 |

TABLE 3

| | Example | | | | | | | |
|---|---|---|---|---|---|---|---|---|
| | 1 | 2 | 3 | 4 | 5 | 6 | 7 | 8 |
| A-1 (mass parts) | PC-1 (100) | PC-2 (100) | PC-3 (25) | PC-3 (25) | PC-4 (100) | PC-5 (100) | PC-5 (50) | PC-6 (100) |
| A-2 (mass parts) | — | — | FN1500A (75) | FN2600A (75) | — | — | FN1700A (50) | — |
| Viscosity-average molecular weight | 17500 | 17300 | 14600 | 24100 | 18400 | 17300 | 17500 | 17200 |
| ΔYI | 0.1> | 0.1> | 0.1> | 0.1> | 0.1 | 0.2 | 0.1 | 0.1> |
| Izod impact strength (kJ/m$^2$) | 85 | 60 | 48 | 105 | 88 | 60 | 86 | 59 |
| Heat deformation temperature (° C.) | 140 | 139 | 136 | 143 | 141 | 139 | 140 | 138 |

| | Example | | | Comparative Example | | | | |
|---|---|---|---|---|---|---|---|---|
| | 9 | 10 | 11 | 1 | 2 | 3 | 4 | 5 |
| A-1 (mass parts) | PC-7 (100) | PC-12 (100) | PC-13 (100) | PC-8 (100) | PC-9 (100) | PC-10 (100) | PC-11 (100) | PC-14 (100) |
| A-2 (mass parts) | — | — | — | — | — | — | — | — |
| Viscosity-average molecular weight | 18100 | 17500 | 17500 | 17500 | 17300 | 17400 | 17300 | 17400 |
| ΔYI | 0.1> | 0.1> | 0.1> | 0.6 | 1.0 | 0.7 | 1.5 | 0.7 |
| Izod impact strength (kJ/m$^2$) | 85 | 85 | 85 | 85 | 60 | 60 | 60 | 60 |
| Heat deformation temperature (° C.) | 141 | 140 | 140 | 140 | 139 | 140 | 139 | 140 |

INDUSTRIAL APPLICABILITY

By using the carbonate-polyorganosiloxane copolymer of the present invention, there can be provided a molded article having excellent thermal stability and excellent color tone even when the molding is carried out at high temperature. Therefore, the present invention can be used in various fields that require the characteristics described above.

The invention claimed is:

1. A polycarbonate-polyorganosiloxane copolymer comprising:

(a) a polycarbonate block composed of a structural unit represented by formula (I);

(b) a polyorganosiloxane block composed of a structural unit represented by formula (II), an average number of repeating of the structural units represented by formula (II) being 70 to 1000, a content of the polyorganosiloxane block in the polycarbonate-polyorganosiloxane copolymer being 1 to 30% by mass; and (c) a phenol residue comprising an allyl group, a content of the phenol residue in the polycarbonate-polyorganosiloxane copolymer being 400 ppm by mass or less, wherein:

a viscosity-average molecular weight of the polycarbonate-polyorganosiloxane copolymer is 13000 to 26000:

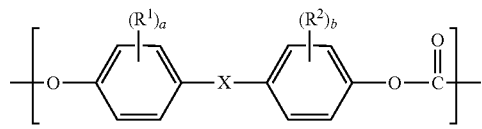

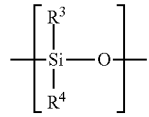

wherein R$^1$ and R$^2$ each independently represent an alkyl group having 1 to 6 carbon atoms or an alkoxy group having 1 to 6 carbon atoms; X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—; R$^3$ and R$^4$ each independently represent a hydrogen atom, a halogen atom, an alkyl group having 1 to 6 carbon atoms, an alkoxy group having 1 to 6 carbon atoms, or an aryl group having 6 to 12 carbon atoms; and a and b each independently represent an integer from 0 to 4.

2. The polycarbonate-polyorganosiloxane copolymer according to claim 1, wherein the phenol residue having an allyl group is an allylphenol residue or an eugenol residue.

3. The polycarbonate-polyorganosiloxane copolymer according to claim 1, wherein the structural unit represented by formula (I) is a structural unit derived from bisphenol A.

4. The polycarbonate-polyorganosiloxane copolymer according to claim 1, wherein R$^3$ and R$^4$ in the structural unit represented by formula (II) are both methyl groups.

5. A polycarbonate resin comprising:
   100 parts by mass of the polycarbonate-polyorganosiloxane copolymer according to claim 1; and
   0 to 90 parts by mass of an aromatic polycarbonate other than the polycarbonate-polyorganosiloxane copolymer, wherein a content of the phenol residue comprising an allyl group in the polycarbonate resin is 200 ppm by mass or less.

6. A method for production of a polycarbonate-polyorganosiloxane copolymer, comprising:

mixing a polycarbonate oligomer and a polyorganosiloxane having molecular ends modified with a phenol compound comprising an allyl group, the polyorganosiloxane being represented by formula (III), a content of the phenol compound in the polyorganosiloxane being 3000 ppm by mass or less; and reacting the mixture with a dihydric phenol in a presence of an alkaline compound:

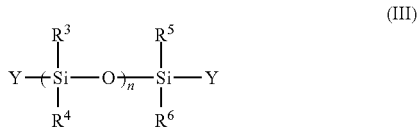
(III)

wherein, in the formula (III), $R^3$, $R^4$, $R^5$, and $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms; Y represents a phenol residue having a trimethylene group represented by formula (IV); and n represents 70 to 1000:

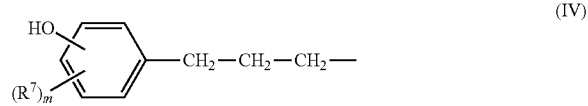
(IV)

wherein, in formula (IV), $R^7$ represents an alkyl group having 1 to 4 carbon atoms or an alkoxy group having 1 to 4 carbon atoms; m represents an integer from 0 to 4; and when there are a plurality of $R^7$'s, they may be the same or different.

7. The method according to claim 6, wherein the phenol compound comprising an allyl group is allylphenol or eugenol.

8. The method according to claim 6, further comprising:

extracting the phenol compound with an alkaline solution to decrease an amount of the phenol compound in the polyorganosiloxane before the mixing.

9. The polycarbonate-polyorganosiloxane copolymer according to claim 1, wherein the content of the phenol residue in the polycarbonate-polyorganosiloxane copolymer is 250 ppm by mass or less.

10. The polycarbonate-polyorganosiloxane copolymer according to claim 1, wherein the content of the phenol residue in the polycarbonate-polyorganosiloxane copolymer is 100 ppm by mass or less.

11. The method according to claim 6, wherein the content of the phenol compound in the polyorganosiloxane is 2000 ppm by mass or less.

* * * * *